United States Patent
Xu

(10) Patent No.: US 9,482,039 B1
(45) Date of Patent: Nov. 1, 2016

(54) HARD COVER

(71) Applicant: Cixi City Liyuan Auto Parts Co., Ltd, Cixi (CN)

(72) Inventor: Enli Xu, Cixi (CN)

(73) Assignee: CIXI CITY LIYUAN AUTO PARTS CO., LTD, CIXI (CN)

( * ) Notice: Subject to any disclaimer, the term of this patent is extended or adjusted under 35 U.S.C. 154(b) by 0 days.

(21) Appl. No.: 14/746,863

(22) Filed: Jun. 23, 2015

(30) Foreign Application Priority Data

May 22, 2015 (CN) .......................... 2015 0 262487
May 22, 2015 (CN) ...................... 2015 2 0332363 U

(51) Int. Cl.
| | |
|---|---|
| B60J 7/14 | (2006.01) |
| E05D 5/14 | (2006.01) |
| E05D 3/12 | (2006.01) |
| E05D 11/06 | (2006.01) |
| B60P 7/04 | (2006.01) |

(52) U.S. Cl.
CPC ................. *E05D 5/14* (2013.01); *B60J 7/141* (2013.01); *B60P 7/04* (2013.01); *E05D 3/125* (2013.01); *E05D 11/06* (2013.01)

(58) Field of Classification Search
CPC ......... E05D 5/14; E05D 11/06; E05D 3/125; B60J 7/141
USPC ..................................................... 296/100.09
See application file for complete search history.

(56) References Cited

U.S. PATENT DOCUMENTS

| | | | | |
|---|---|---|---|---|
| 4,563,034 A * | 1/1986 | Lamb | ....................... | B60J 7/068 160/266 |
| 5,087,093 A * | 2/1992 | Repetti | ..................... | B60J 7/141 296/100.09 |
| 5,961,173 A * | 10/1999 | Repetti | ..................... | B60J 7/141 296/100.01 |
| 6,827,389 B1 * | 12/2004 | Pandorf | ................... | B60J 7/141 296/100.02 |
| 2001/0035664 A1 * | 11/2001 | Steffens | .................... | B60J 7/141 296/100.09 |
| 2007/0108792 A1 * | 5/2007 | Weldy | ........................ | B60J 7/08 296/100.09 |
| 2007/0210609 A1 * | 9/2007 | Maimin | .................... | B60P 7/02 296/100.09 |
| 2008/0100088 A1 * | 5/2008 | Calder | ..................... | B60J 7/141 296/100.09 |
| 2010/0140973 A1 * | 6/2010 | Duncan | ....................... | B60J 7/20 296/100.09 |
| 2013/0015678 A1 * | 1/2013 | Williamson | ........... | B60J 7/1607 296/100.09 |
| 2015/0054300 A1 * | 2/2015 | Shi | ........................... | B60J 7/141 296/100.09 |

\* cited by examiner

*Primary Examiner* — Pinel Romain

(74) *Attorney, Agent, or Firm* — Kilpatrick Townsend & Stockton LLP

(57) ABSTRACT

A hinge for a tonneau cover includes a first hinge member and a second hinge member oriented in an opposite direction as the first hinge member. Each of the hinge members includes a hook-shaped rail having a flat portion and a hooked end directed in a direction toward a body of the hinge member. The hooked end is positioned near a same side of the hinge member as a top surface of the body. The hinge body includes an edge positioned near a base of the hook-shaped rail. The hinge includes a hinge junction having a first curved lip and a second curved lip extending from a top surface of the hinge junction. The top surface is positioned opposite a base of the hinge junction. The curved lips are configured to pivotably receive the hook-shaped rails of the first and second hinge members.

14 Claims, 8 Drawing Sheets

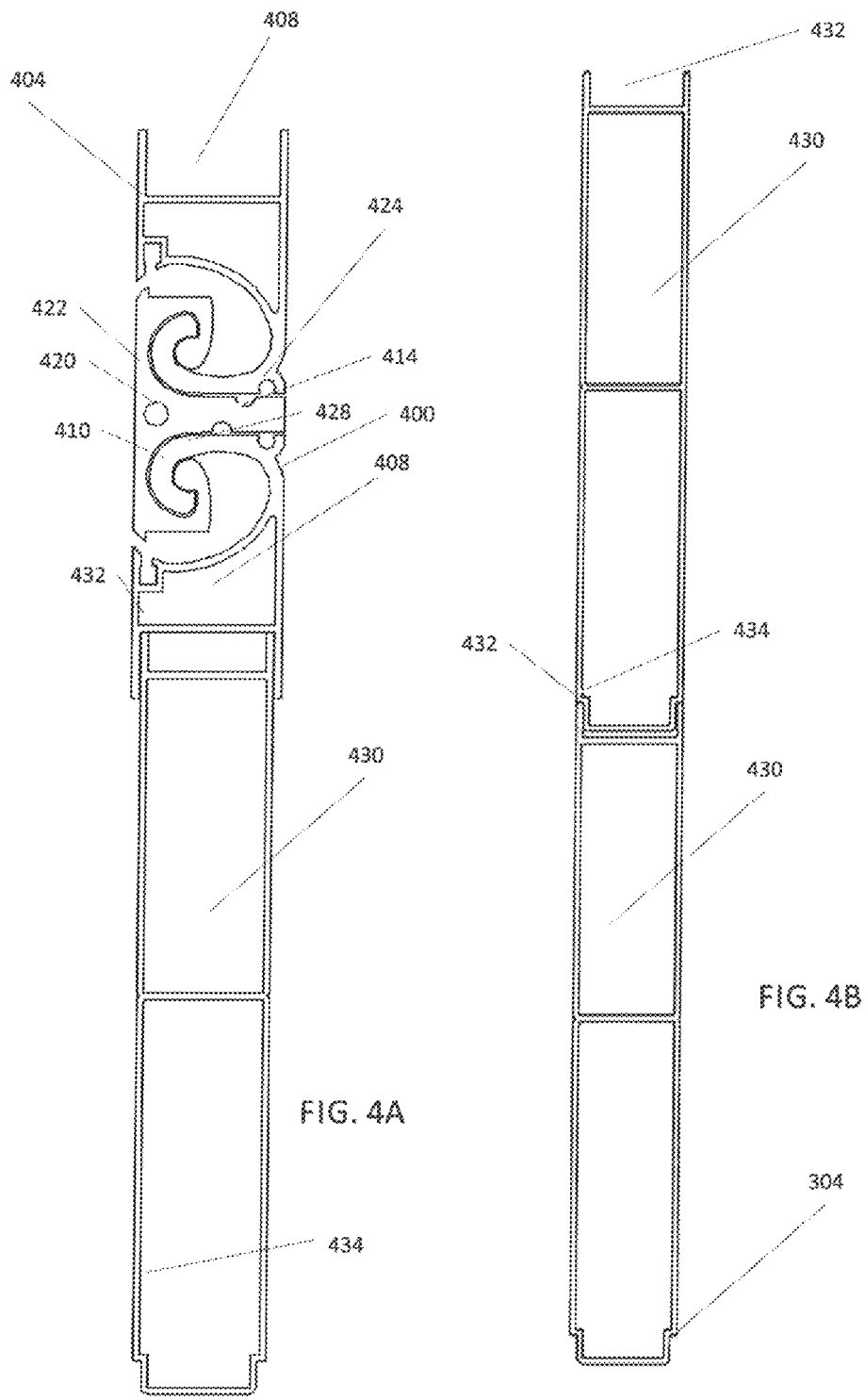

HARD COVER

Cover systems are often used to protect cargo beds of pickup trucks. The cover systems often cover all or a portion of the cargo bed such that any items stored and/or hauled in the cargo bed are protected from outside elements, as well as theft. In order to accommodate the storage and/or hauling of larger objects, as well as to facilitate easy loading and unloading of the cargo bed, many conventional cover systems are foldable into a storage position. This enables the cargo bed to be exposed without removing the cover entirely from the truck. However, this can cause visibility problems, as conventional cover systems block the view through the rear window of the pickup truck when the cover is in a folded position. Thus, driving may be unsafe while the cover system is folded for any reason. Additionally, when coupling multiple cover panels and/or hinges, seams are often formed such that water and other liquids may easily pass through and reach any cargo within the truck bed.

BRIEF SUMMARY OF THE INVENTION

The present invention provides folding tonneau hard cover systems that seal and protect the cargo bed of a pickup truck. The cover systems may extend to cover all or part of the cargo bed, or may be folded up and locked into a stowed position. The stowed position may be adjusted such that at least a portion of a rear window of the pickup truck may be exposed. This makes driving with a cover system much safer. Embodiments may utilize panel sizes and/or adjustable stowed positions to provide the added visibility. Additionally, embodiments provide hinge and panel pieces that are readily coupleable such that no porous seams exist for water and other liquids to pass through.

In one aspect, a flexible tonneau cover for covering a bed of a pickup truck is provided. The cover may include a first panel, a second panel, and a first hinge member coupled with the first panel. The first hinge member may include a first hook-shaped rail having a first flat portion and a first hooked end directed in a first direction toward a first body of the first hinge member. The first hooked end may be positioned near a same side of the first hinge member as a first top surface of the body. The first hinge body may include a first edge positioned near a first base of the first hook-shaped rail. The cover may also include a second hinge member coupled with the second panel. The second hinge member may include a second hook-shaped rail having a second flat portion and a second hooked end directed in a second direction opposite the first direction toward a second body of the second hinge member. The second hooked end may be positioned near a same side of the second hinge member as a second top surface of the second body. The second hinge body may include a second edge positioned near a second base of the second hook-shaped rail. The cover may further include a hinge junction having a first curved lip and a second curved lip extending from a top surface of the hinge junction. The top surface of the hinge junction may be positioned opposite a base of the hinge junction. The first curved lip may be configured to pivotably receive the first hook-shaped rail. The second curved lip may be configured to pivotably receive the second hook-shaped rail.

In another aspect, a hinge for a tonneau cover is provided. The hinge may include a first hinge member and a second hinge member oriented in an opposite direction as the first hinge member. Each of the hinge members may include a hook-shaped rail having a flat portion and a hooked end directed in a direction toward a body of the hinge member. The hooked end may be positioned near a same side of the hinge member as a top surface of the body. The hinge body may include an edge positioned near a base of the hook-shaped rail. The hinge may also include a hinge junction having a first curved lip and a second curved lip extending from a top surface of the hinge junction. The top surface may be positioned opposite a base of the hinge junction. The first curved lip may be configured to pivotably receive the hook-shaped rail of the first hinge member. The second curved lip may be configured to pivotably receive the hook-shaped rail of the second hinge member. The hinge may be positionable in an extended configuration, a partially folded configuration, and a folded configuration. In the extended configuration, the top surface of the hinge junction may be substantially parallel to the top surfaces of the first hinge member and the second hinge member and the flat portions of the first hinge member and the second hinge member may be in contact with at least a portion of the base of the hinge junction. In the partially folded configuration, the top surface of the hinge junction may be substantially parallel to the top surface of one of the first hinge member or the second hinge member, the flat portion of the one hinge member may be in contact with at least a portion of the base of the hinge junction, the top surface of the hinge junction may be substantially perpendicular to the top surface of the other of the first hinge member or the second hinge member, and the edge of the other hinge member may be in contact with at least a portion of the top surface of the hinge junction. In the folded configuration, the top surface of the hinge junction may be substantially perpendicular to the top surfaces of the first hinge member and the second hinge member and the edges of the first hinge member and the second hinge member may be in contact with at least a portion of the top portion of the hinge junction.

In another aspect, the hinge may include a first hinge member and a second hinge member oriented in an opposite direction as the first hinge member. Each of the hinge members may include a hook-shaped rail having a flat portion and a hooked end directed in a direction toward a body of the hinge member. The hooked end may be positioned near a same side of the hinge member as a top surface of the body. The hinge body may include an edge positioned near a base of the hook-shaped rail. The hinge may also include a hinge junction having a first curved lip and a second curved lip extending from a top surface of the hinge junction. The top surface may be positioned opposite a base of the hinge junction. The first curved lip may be configured to pivotably receive the hook-shaped rail of the first hinge member. The second curved lip may be configured to pivotably receive the hook-shaped rail of the second hinge member.

BRIEF DESCRIPTION OF THE DRAWINGS

FIG. 4A shows a hinge coupled with a panel according to embodiments.

FIG. 4B shows a multiple panels coupled with one another according to embodiments.

DETAILED DESCRIPTION OF THE INVENTION

The present invention provides folding tonneau cover systems that seal and protect the cargo bed of a pickup truck. The cover systems may extend to cover all or part of the cargo bed, or may be folded up and locked into a stowed position. The stowed position may be adjusted such that at least a portion of a rear window of the pickup truck may be exposed. This makes driving with a cover system much safer. Embodiments may utilize panel sizes and/or adjustable stowed positions to provide the added visibility.

Figure 1A:
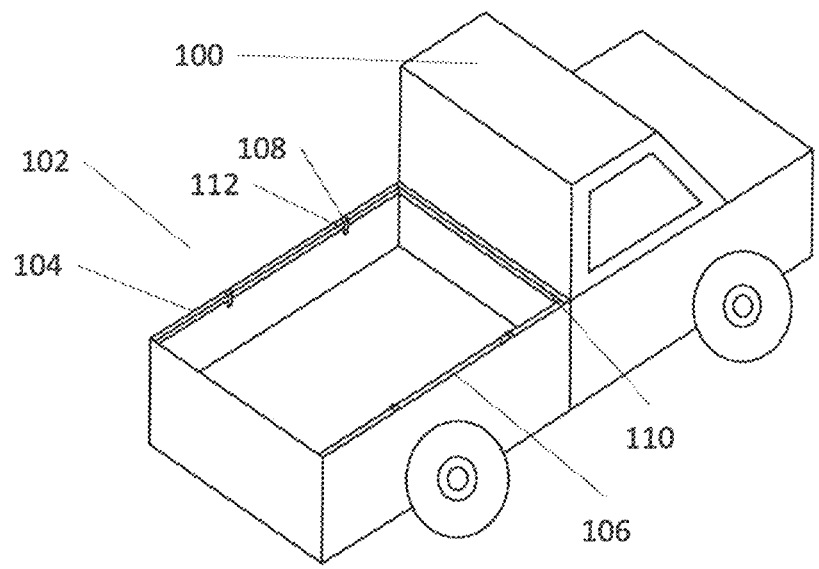
FIG. 1A shows a pickup truck with side rails secured to bed rails of the truck according to embodiments.

Referring now to FIGS. 1A-1H, one embodiment of a pickup truck 100 having a foldable tonneau cover system 102 is shown. FIG. 1A shows pickup truck 100 with side rails 104 secured to bed rails 106 of the truck 100. Side rails 104 may extend along all or part of a length of the bed of truck 100. Side rails 104 may be secured to the bed rails 106 using one or more clamps 108. Clamps 108 may be C-clamps, clamps described in FIGS. 2A and 2B herein, or any other clamps known in the art. The number of clamps 108 used may depend on the size of truck 100, although oftentimes only one or two clamps 108 are necessary on each side of the truck 100 to safely secure the side rails 104 to the bed rails 106. In some embodiments, clamps 108 may be configured to interface with mating features on the side rails 104, while in other embodiments, the clamps 108 may be configured to fit at any position of the side rails 104. The clamps 108 may be spaced equal distances apart from one another or may be staggered at varying intervals. In some embodiments, the cover system 102 may include a head rail 110 positioned next to a cab of the truck 100 and forward of the side rails 104. The side rails 104 may include one or more mounting features 112. Mounting features 112 may be positioned along the length of the side rails 104. In some embodiments, multiple mounting positions may be provided on the side rails 104 such that the location of the mounting feature 112 may be adjusted.

Figure 1B:
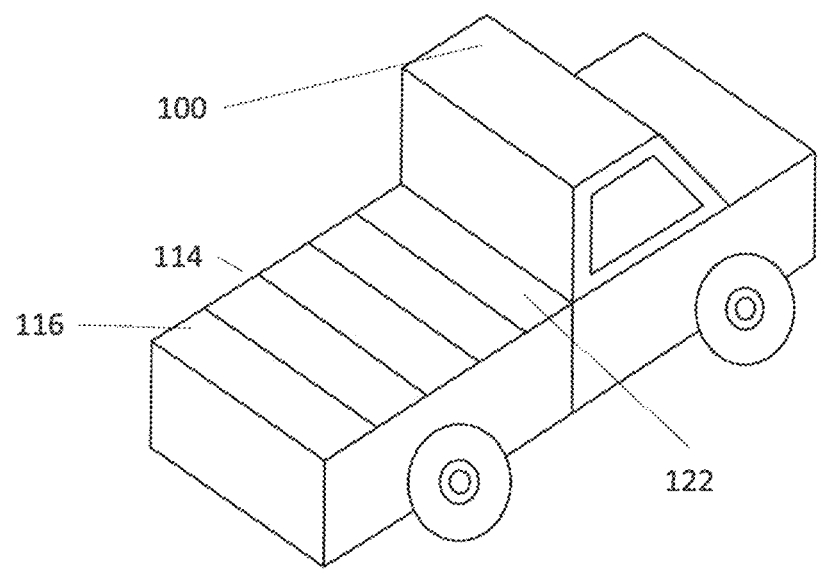
FIG. 1B shows the truck of FIG. 1A having a cover positioned over the entire length of the truck bed according to embodiments.
Figure 1C:
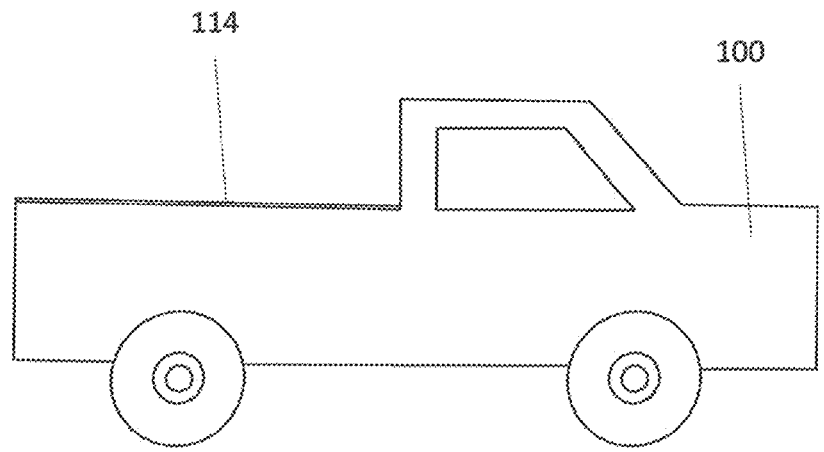
FIG. 1C is a side view of the truck of FIG. 1B according to embodiments.
Figure 1D:
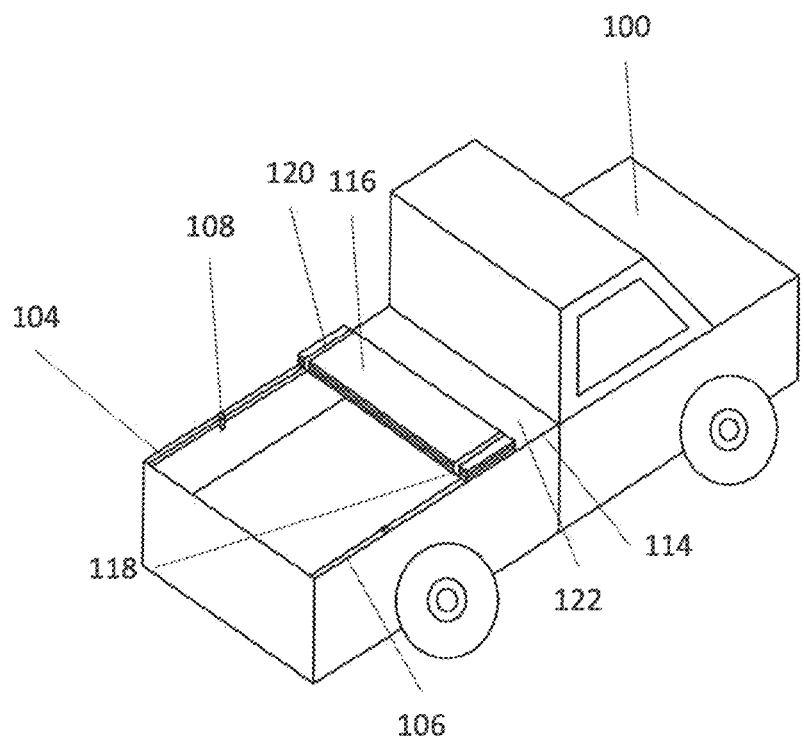
FIG. 1D shows the truck of FIG. 1A with the cover partially folded according to embodiments.
Figure 1E:
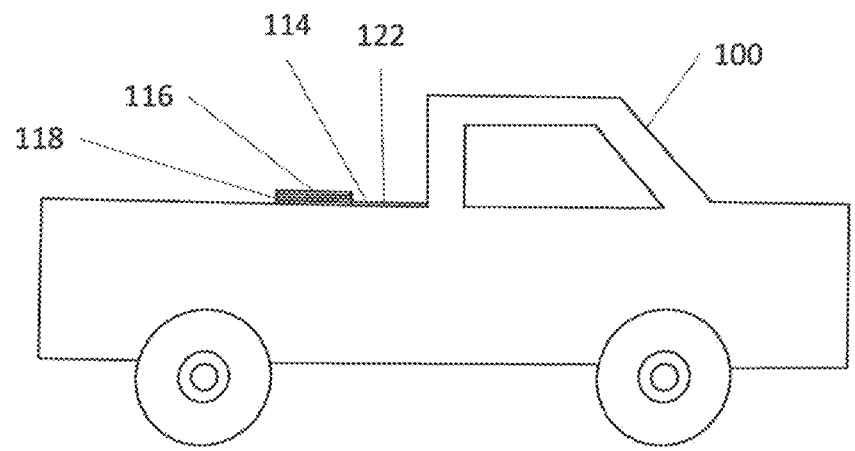
FIG. 1E shows a side view of the truck of FIG. 1D according to embodiments.

FIG. 1B shows truck 100 having a cover 114 positioned over the entire length of the truck bed. Cover 114 may include one or more panels 116 that are pivotably coupled with one another. While shown here with five panels 116, it will be appreciated that any number of panels 116 may be used to form cover 114, such as two, three, four, or six panels, although additional panels 116 may be used. The panels 116 may be formed from a single piece of material and/or share an external cover such that there are no exposed seams for external substances to leak through. In other embodiments, the panels 116 may be separate pieces of material coupled together. Strips of material may be provided to cover the seams formed from the junction of the panels 116 allow the cover 114 to seal the bed. Cover 114 may be made of a metal, a synthetic material such as a plastic, leather, and/or a combination of such materials. Cover 114 may be less than 1 inch thick, such that minimal height is added to the profile of the truck bed as seen in the side view of FIG. 1C, although thicker covers 114 may be used. The panels 116 may be folded back on one another toward a front of the bed to expose all or a portion of the bed as shown in FIG. 1D. In some embodiments, hinges 118 are used to pivotably couple the panels 116 together. In some embodiments, hinges 118 may be positioned on an underside of the panels 116. This allows the hinges to be protected from outside elements and also allows the cover to have a flat or relatively flat surface. In some embodiments, hinges 118 may be coupled with cover rails 120 that are positioned on an underside of some or all of the panels 116. Each panel 116 may have a cover rail 120 on a left and a right side of the panel 116, and the cover rails 120 of adjacent panels 116 may be coupled to one another using a hinge 118. Hinges 118 enable any number of panels 116 to be folded back on one another toward a front of the bed to expose a desired amount of the bed. FIG. 1E shows a side view of truck 100 with cover 114 in a partially folded position.

Figure 1F:
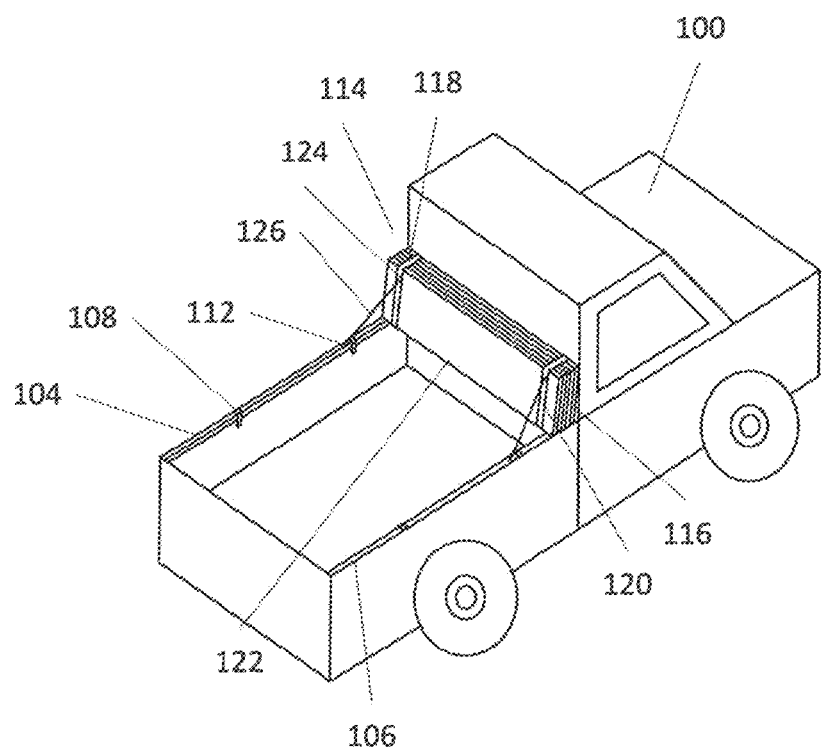
FIG. 1F shows the truck of FIG. 1A with the cover folded into a stowed position according to embodiments.
Figure 1G:
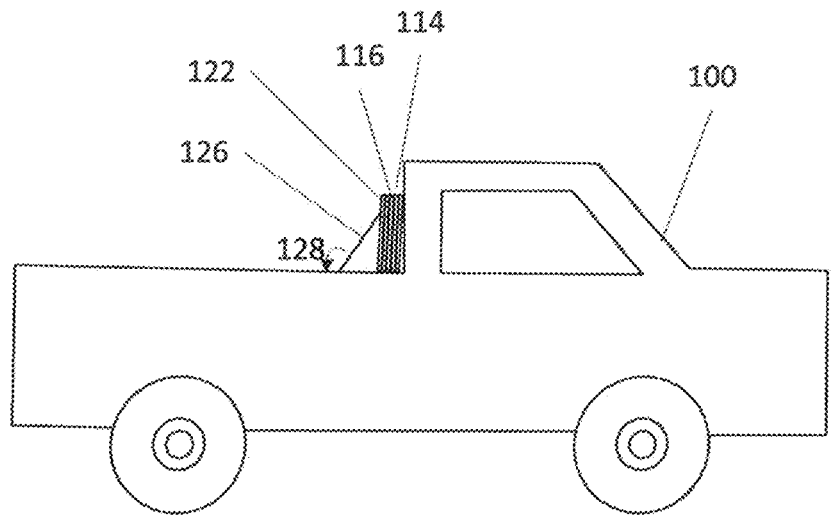
FIG. 1G shows a side view of the truck of FIG. 1F according to embodiments.
Figure 1H:
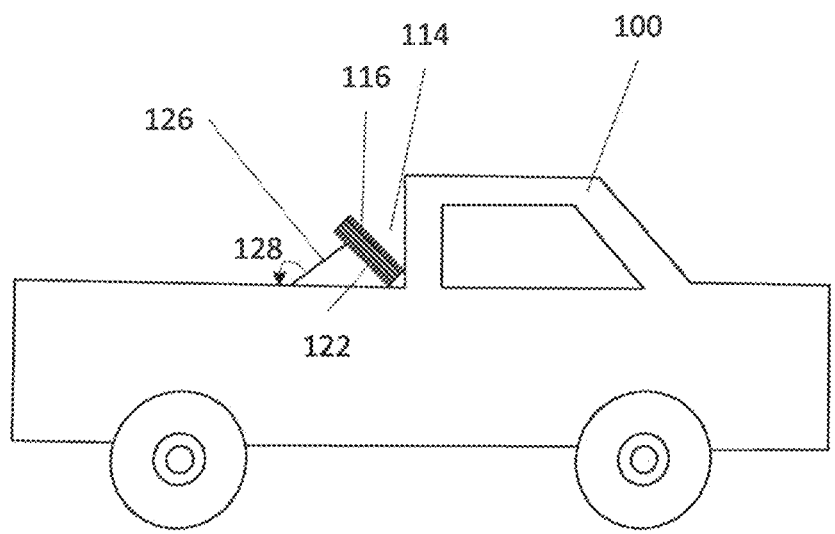
FIG. 1H shows the truck of FIG. 1G having rods at a second angle according to embodiments.

FIG. 1F shows the cover 114 folded into a stowed position. In the stowed position, a forwardmost panel 122 of panels 116 may include one or more mounting features 124 on an underside of the panel 122. In some embodiments, the mounting features 124 may be coupled with or formed integral to the cover rails 120, while in other embodiments, the mounting features 124 may be coupled with the underside of the panel 122. The mounting features 124 on the panel 122 and the mounting features 112 of the side rails may be configured to be removably coupled with rods 126 to maintain cover 114 in the stowed position. In some embodiments, mounting features 112 and/or mounting features 124 are configured to lockably receive an end of a rod 126. In other embodiments, rods 126 may be configured to lockably receive a portion of mounting features 112 and/or mounting features 124. When not used to lock cover 114 in a stowed position, rod 126 may be snapped into or magnetically secured to a rod storage mechanism (not shown). A length of panels 116 may be selected such that when in the stowed position, at least a portion of the rear window of the truck 100 is exposed. In some embodiments, multiple mounting positions are included on one or both of the side rails 104 and/or the forwardmost panel 122 such that the location of the mounting features 112 and/or mounting features 124 may be adjusted as seen in FIGS. 1G and 1H. For example, in FIG. 1G, mounting features 112 and mounting features 124 are positioned with rod 126 at an angle 128 relative to the bed such that the cover 114 is folded at least substantially upright against a back of the cab of truck 100. In FIG. 1H, the angle 128 is increased to change the angle of the folded cover 114. By angling the folded cover, the amount of rear window exposure may be increased to enhance driver visibility. The lengths of panels 116 and/or the possible rod angles 128 may be selected to meet the visibility needs and dimensions of a particular truck or may be standardized for lower manufacturing costs.

Figure 2A:
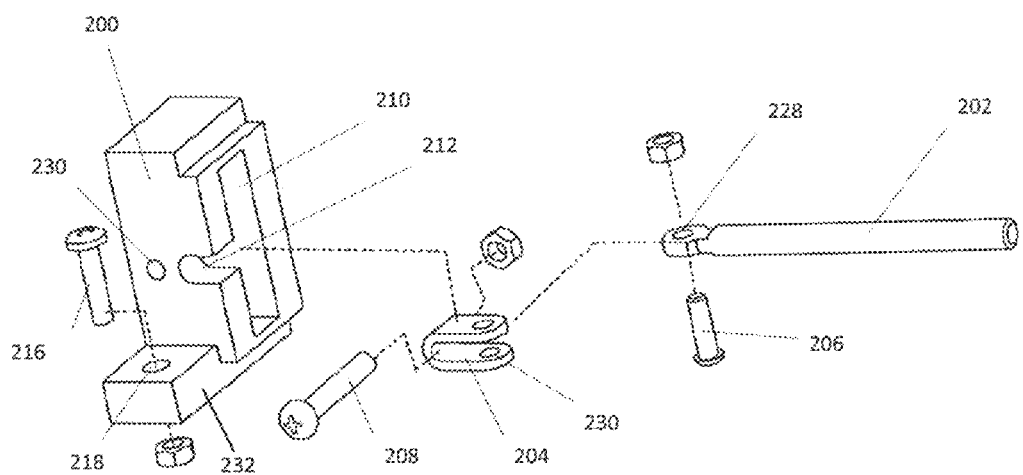
FIG. 2A shows an exploded view of components of a clamp according to embodiments.
Figure 2B:
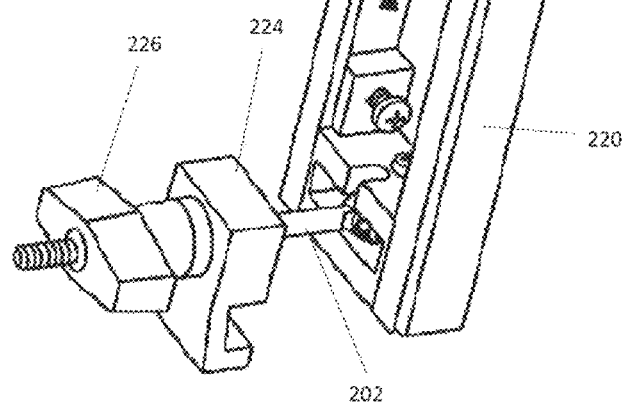
FIG. 2B shows a clamp according to embodiments.

FIGS. 2A and 2B show one embodiment of a clamp that may be used to secured a cover to a pickup truck bed. The clamp may correspond to clamp 108 of FIGS. 1A-1H and may attach to a side rail, a hinge, and/or directly to the cover.

As shown in FIG. 2A, a pivotable arm 202 may be connected to a base 200. For example, the pivotable arm 202 may be received within an opening 210 defined by the base 200. Pivotable arm 202 may define an aperture 228 at an end near base 200 that may be received within a u-shaped bracket 204. U-shaped bracket prevents lateral movement in one direction while allowing pivotable arm 202 to move from an extended clamping position as shown in FIG. 2B, to a stowed position where the pivotable arm 202 extends through a channel 212 formed in base 200. Fasteners 206 and 208 may be positioned through apertures 228 and 230, and 204, respectively, to secure the pivotable arm 202 within channel 210. Base 200 may be slidingly received within a channel 222 of a rail 220. For example, the base 200 may be secured by arms extending around a portion of channel 222. Rail 220 may be coupled with a side rail, hinge, and/or the cover. Base 200 may include a flange or arm 232 that defines an aperture 218. A fastener 218, such as a set screw, may be positioned through the aperture 218 such that the fastener 218 may engage a portion of the walls of channel 222 to set the base 200 at a desired position within channel 222. This allows the clamp to be adjusted to fit different pickup truck beds and bed rails. A hook feature 224 may be positioned on pivotable arm 202 such that the hook feature 224 may engage with the bed rail of the pickup truck to maintain the clamp and cover in a secured position on the pickup truck bed. Pivotable arm 202 may be threaded such that a knob 226 may be used to tighten the hook feature 224 against the bed rail. This further enhances the adjustability of the clamp to fit any pickup.

Figure 3A:
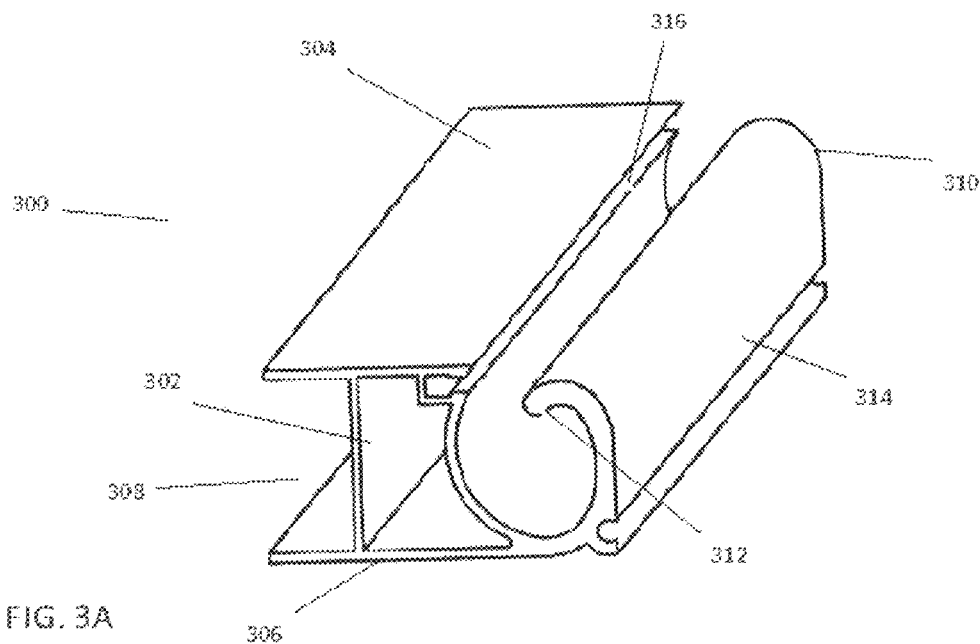
FIG. 3A shows a hinge member according to embodiments.

FIGS. 3A-3D depict an embodiment of a hinge used to fold and extend a hard tonneau cover. The hinge may correspond to hinge 118 of FIGS. 1A-1H. As seen in FIG. 3A, the hinge may include two hinge members 300 positioned in opposite directions from one another, with a hinge junction 320 coupling the two hinge members 300 together. Each hinge member 300 may include a body 302 having a top surface 304 and a bottom surface 306. The top surface 304 and the bottom surface 306 may define an opening 308 that is configured to receive an edge of a panel of a hard tonneau cover. A hook-shaped rail 310 may extend from an opposite end of the bottom surface 306 as the opening 308. Hook-shaped rail 310 may include a flat portion 314 extending toward the top surface side of body 302 before forming a hooked end 312.

Figure 3B:
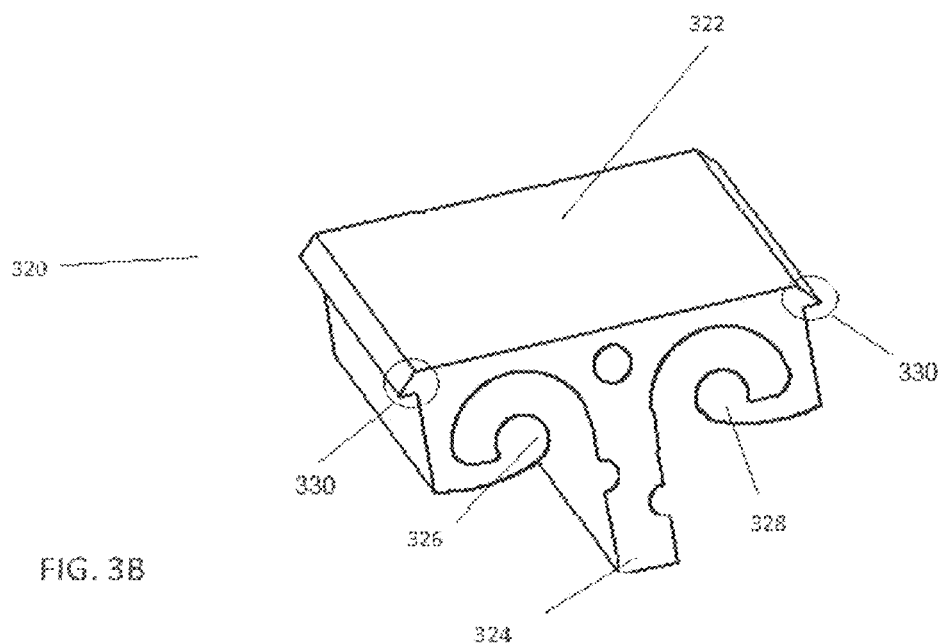
FIG. 3B shows a hinge junction according to embodiments.
Figure 3C:
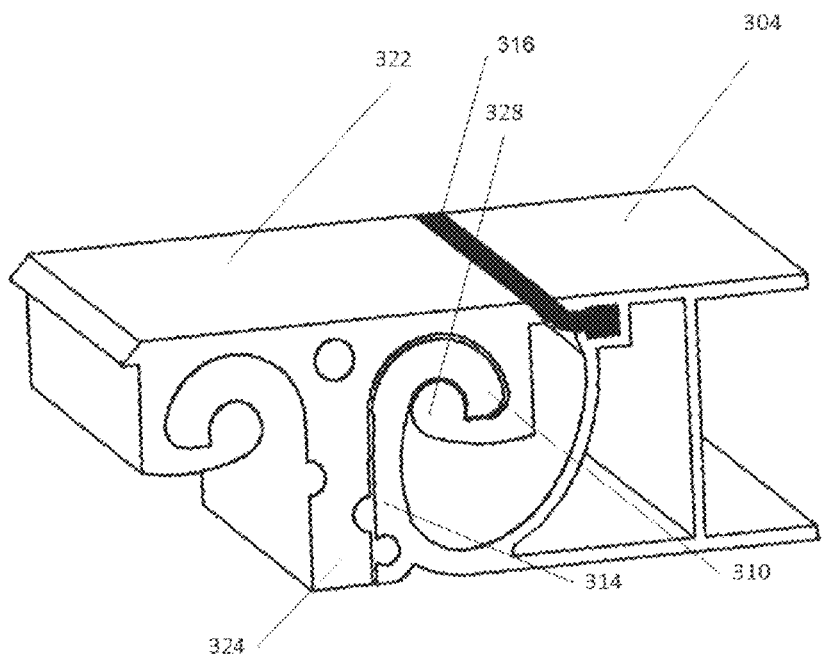
FIG. 3C shows a hinge in an extended configuration according to embodiments.

FIG. 3B shows a hinge junction 320 having a top surface extending from a base 324. In some embodiments, hinge junction 320 may be t-shaped such that it may pivotably couple with two hinge members 300, one on either side of the t-shape. For example, hinge junction 320 may include a first curved lip 326 and a second curved lip 328 extending from the top surface 322. The top surface 322 comprises notched corners 330 as shown, which extend across the edges of the top surface 322 for interfacing sealing members described below. The first curved lip 326 and the second curved lip 328 may extend in opposite directions, and each curved lip may curl back toward the base 324. The curved lips 326 and 328 are configured to pivotably couple with the hook-shaped rails 310 of the hinge members 300. For example, the hinge member 300 and hinge junction 320 may be coupled in an extended position as shown in FIG. 3C where curved lip 328 engages hook-shaped rail 310 such that hook-shaped rail 310 may be received in a channel formed between base 324 and curved lip 328. The flat portion 314 may be in contact with base 324. This contact helps prevent further pivoting, and maintains the top surface 322 and top surface 304 in a substantially parallel and/or substantially planar orientation. A second hinge member 300 may be included in a similar orientation on an opposite side of hinge junction 320 such that a panel coupled to the first hinge member 300 and a panel coupled to the second hinge member (not shown) are substantially parallel and/or substantially planar, as well as extend in opposite directions.

Figure 3D:
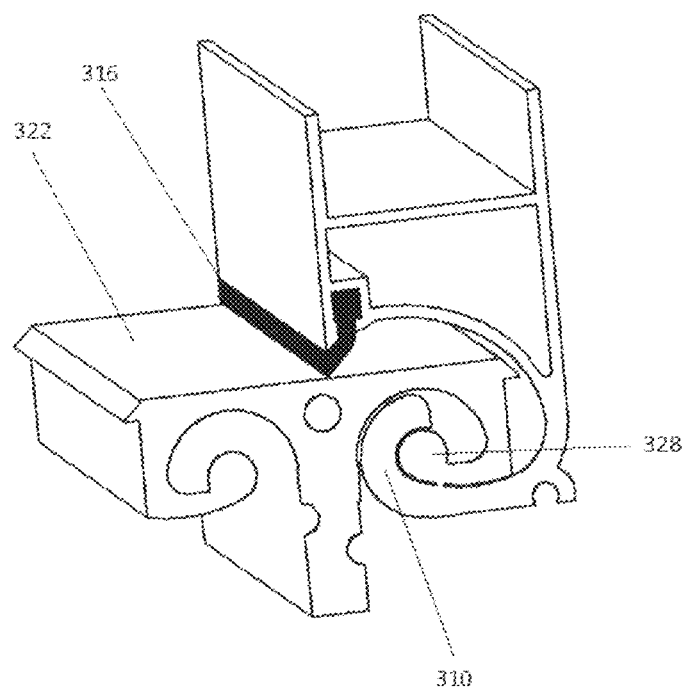
FIG. 3D shows a hinge in a partially folded configuration according to embodiments.

The hinge may be in a partially folded and/or a folded configuration as well. FIG. 3D shows a hinge in a partially folded configuration where the hook-shaped rail 310 is slide partially out of the channel formed between curved lip 328 and base 324 such that the hinge member 300 is rotated approximately 90° relative to the hinge junction 320. Edge 316 may contact top surface 322 to prevent the hinge member 300 from rotating further, thus preventing the hook-shaped rail 310 from slipping out of the channel and/or from engaging the curved lip 328. Among other features, the hinge includes a weather sealing strip 316 that interfaces between the notched corners 330 (a part of the top surface 322) shown in FIG. 3B and the top surface 304. For example, the weather sealing strip 316 comprises flexible and weather resistant material, such as rubber, polymer, and/or other types of material. The weather sealing strip 316 prevents water from going through the hinge. As shown in FIG. 3D, the weather sealing strip stays with between the interface of surface 322 and surface 304 when the hinge is in an angled position, which keeps the assembly weather sealed. In the partially folded configuration, one hinge member 300 is folded as shown in FIG. 3D, while a second hinge member 300 is extended as shown in FIG. 3C. In the folded configuration, both hinge members 300 are in the folded position shown in FIG. 3D such that panels coupled to the hinge members 300 are substantially parallel, but not planar, with top surfaces of the panels touching and/or substantially parallel.

FIGS. 4A and 4B show and embodiment of a tonneau cover. In FIG. 4A, a panel 430 is received within an opening 408 of a hinge member 400 of a hinge. The hinge may be formed from two hinge members 400 coupled with a hinge junction 420. Hinge, hinge members 400, and hinge junction 420 may correspond to the hinge, hinge members 300, and hinge junction 320 described in FIGS. 3A-3D. Here, hinge is in an extended configuration with hook-shaped rails 410 engaging with curved lips 428 to pivotably secure panel 430 with a second panel (not shown). Flat portions 414 of the hinge members 400 may contact a base of hinge junction 420 to maintain the hinge in the extended position with top surface 422 of hinge junction substantially parallel to and/or substantially planar to top surface 404 of the hinge members 400. As shown in FIG. 4B, panel 430 may include a protrusion 434 at a first end and a receptacle or opening 432 defined by a top surface and a bottom surface of the panel 430. The protrusion 434 may be configured to be received and secured within the opening 432 of a second panel 430. By inserting the protrusion 434 into an opening 432, multiple panels 430 may be easily coupled while eliminating seams. This helps to seal the cover, as water and other liquids are prevented from seeping through a seam running straight through the coupling. In some embodiments, the cover 430 may be coupled to the hinge member 400 in this manner. Referring back to FIG. 4A, cover 430 is slidingly received within opening 408 such that no seam is formed. In some embodiments, opening 408 may be configured to receive a protrusion 434, while in other embodiments, the opening may receive the opening side 432 of panel 432. A friction fit, snap fit, press fit, and/or other mechanisms may be used to secured covers with other covers and/or hinge members. Depending on the implementation, panels 430 can be coupled to one another in various ways, such as welding, gluing, and/or others. By using multiple segments to form a single piece of panel, the manufacturing and transporting costs can be much lower than that of one-piece design. For example, one-piece designs typically require relatively large sized (compared to segmented design according to embodiments of the present invention) tools to form panel, and as a result tooling costs are high. Additionally, since each segment, as shown in FIG. 4B, includes both horizontal surface and bottom layers and vertical walls, a panel with multiple segments according to embodiments of the present invention can provide a higher degree of structure integrity and strength.

The components and features described herein may be formed from any material, such as a plastic or metal. Metal alloys, such as those containing aluminum, steel, and/or titanium, may add ruggedness and enhance the safety of the cover systems described herein. Pads may be provided to place between components of the cover systems and the bed rails to prevent damage to the bed rails. For example, pads may be included between the bed rails and side rails, clamps, and/or corner pieces. Components and features described herein having similar names may be interchanged within embodiments. Additionally, it will be appreciated that embodiments of the invention may add, subtract, separate, form integral, combine, and/or otherwise manipulate the features described herein.

Specific details are given in the description to provide a thorough understanding of the embodiments. However, it will be understood by one of ordinary skill in the art that the embodiments may be practiced without these specific details. For example, well-known, processes, structures, and techniques have been shown without unnecessary detail in order to avoid obscuring the embodiments. This description provides example embodiments only, and is not intended to limit the scope, applicability, or configuration of the invention. Rather, the preceding description of the embodiments will provide those skilled in the art with an enabling description for implementing embodiments of the invention. Various changes may be made in the function and arrangement of elements without departing from the spirit and scope of the invention.

Also, it is noted that the embodiments may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure.

Having described several embodiments, it will be recognized by those of skill in the art that various modifications, alternative constructions, and equivalents may be used without departing from the spirit of the invention. For example, the above elements may merely be a component of a larger system, wherein other rules may take precedence over or otherwise modify the application of the invention. Also, a number of steps may be undertaken before, during, or after the above elements are considered. Accordingly, the above description should not be taken as limiting the scope of the invention.

What is claimed is:

1. A flexible tonneau cover for covering a bed of a pickup truck, the cover comprising
 a first panel;
 a second panel;
 a first hinge member coupled with the first panel, the first hinge member comprising a first hook-shaped rail having a first flat portion and a first hooked end directed in a first direction toward a first body of the first hinge member, wherein the first hooked end is positioned near a same side of the first hinge member as a first top surface of the body, and wherein the first hinge body comprises a first edge positioned near a first base of the first hook-shaped rail;
 a second member coupled with the second panel, the second hinge member comprising a second hook-shaped rail having a second flat portion and a second hooked end directed in a second direction opposite the first direction toward a second body of the second hinge member, wherein the second hooked end is positioned near a same side of the second hinge member as a second top surface of the second body, and wherein the second hinge body comprises a second edge positioned near a second base of the second hook-shaped rail; and
 a hinge junction having a first curved lip and a second curved lip extending from a top surface of the hinge junction, the top surface of the hinge junction positioned opposite a base of the hinge junction, wherein the first curved lip is configured to pivotably receive the first hook-shaped rail, wherein the second curved lip is configured to pivotably receive the second hook-shaped rail.

2. The flexible tonneau cover for covering the bed of a pickup truck according to claim 1, wherein:
 the cover is positionable in an extended configuration such that the top surface of the hinge junction is substantially parallel to the first top surface and the second top surface and such that the first flat portion and the second flat portion are in contact with at least a portion of the base of the hinge junction.

3. The flexible tonneau cover for covering the bed of a pickup truck according to claim 1, wherein:
 the cover is positionable in a partially folded configuration such that the top surface of the hinge junction is substantially parallel to one of the first top surface or the second top surface, the flat portion corresponding to the one top surface is in contact with at least a portion of the base of the hinge junction, the top surface of the hinge junction is substantially perpendicular to the other top surface, and the edge corresponding to the other top surface is in contact with at least a portion of the top surface of the hinge junction.

4. The flexible tonneau cover for covering the bed of a pickup truck according to claim 1, wherein:
 the cover is positionable in a folded configuration such that the top surface of the hinge junction is substantially perpendicular to the first top surface and the second top surface and such that the first edge and the second edge are in contact with at least a portion of the top portion of the hinge junction.

5. The flexible tonneau cover for covering the bed of a pickup truck according to claim 1, wherein:
 the first hinge member comprises a bottom surface; and
 the first top surface and the bottom surface define an opening configured to receive an edge of the first panel such that there is no seam formed from the coupling of the first hinge member and the first panel.

6. The flexible tonneau cover for covering the bed of a pickup truck according to claim 1, wherein:
 the cover comprises a third panel configured to couple with the first panel;
 one of the first panel and the third panel comprises a protrusion configured to mate with an opening in the other of the first panel and the third panel such that there is no seam formed from the coupling of the first panel and the third panel.

7. A hinge for a tonneau cover, the hinge comprising
a first hinge member;
a second hinge member oriented in an opposite direction as the first hinge member, wherein each of the hinge members comprises a hook-shaped rail having a flat portion and a hooked end directed in a direction toward a body of the hinge member, wherein the hooked end is positioned near a same side of the hinge member as a top surface of the body, and wherein the hinge body comprises an edge positioned near a base of the hook-shaped rail; and
a hinge junction having a first curved lip and a second curved lip extending from a top surface of the hinge junction, the top surface positioned opposite a base of the hinge junction, the first curved lip being configured to pivotably receive the hook-shaped rail of the first hinge member, and the second curved lip being configured to pivotably receive the hook-shaped rail of the second hinge member, wherein:
the hinge is positionable in an extended configuration, a partially folded configuration, and a folded configuration;
in the extended configuration, the top surface of the hinge junction is substantially parallel to the top surfaces of the first hinge member and the second hinge member and the flat portions of the first hinge member and the second hinge member are in contact with at least a portion of the base of the hinge junction;
in the partially folded configuration, the top surface of the hinge junction is substantially parallel to the top surface of one of the first hinge member or the second hinge member, the flat portion of the one hinge member is in contact with at least a portion of the base of the hinge junction, the top surface of the hinge junction is substantially perpendicular to the top surface of the other of the first hinge member or the second hinge member, and the edge of the other hinge member is in contact with at least a portion of the top surface of the hinge junction; and
in the folded configuration, the top surface of the hinge junction is substantially perpendicular to the top surfaces of the first hinge member and the second hinge member and the edges of the first hinge member and the second hinge member are in contact with at least a portion of the top portion of the hinge junction.

8. The hinge for a tonneau cover according to claim 7, wherein:
the first hinge member comprises a bottom surface; and
the top surface of the first hinge member and the bottom surface define an opening configured to receive an edge of a panel such that there is no seam formed from the coupling of the first hinge member and the panel.

9. A hinge for a tonneau cover, the hinge comprising
a first hinge member;
a second hinge member oriented in an opposite direction as the first hinge member, wherein each of the hinge members comprises a hook-shaped rail having a flat portion and a hooked end directed in a direction toward a body of the hinge member, wherein the hooked end is positioned near a same side of the hinge member as a top surface of the body, and wherein the hinge body comprises an edge positioned near a base of the hook-shaped rail; and
a hinge junction having a first curved lip and a second curved lip extending from a top surface of the hinge junction, the top surface positioned opposite a base of the hinge junction, the first curved lip being configured to pivotably receive the hook-shaped rail of the first hinge member, and the second curved lip being configured to pivotably receive the hook-shaped rail of the second hinge member.

10. The hinge for the tonneau cover according to claim 9, wherein:
the hinge is positionable in an extended configuration; and
in the extended configuration, the top surface of the hinge junction is substantially parallel to the top surfaces of the first hinge member and the second hinge member and the flat portions of the first hinge member and the second hinge member are in contact with at least a portion of the base of the hinge junction.

11. The hinge for the tonneau cover according to claim 9, wherein:
the hinge is positionable in a partially folded configuration; and
in the partially folded configuration, the top surface of the hinge junction is substantially parallel to the top surface of one of the first hinge member or the second hinge member, the flat portion of the one hinge member is in contact with at least a portion of the base of the hinge junction, the top surface of the hinge junction is substantially perpendicular to the top surface of the other of the first hinge member or the second hinge member, and the edge of the other hinge member is in contact with at least a portion of the top surface of the hinge junction.

12. The hinge for the tonneau cover according to claim 9, wherein:
the hinge is positionable in a folded configuration; and
in the folded configuration, the top surface of the hinge junction is substantially perpendicular to the top surfaces of the first hinge member and the second hinge member and the edges of the first hinge member and the second hinge member are in contact with at least a portion of the top portion of the hinge junction.

13. The hinge for the tonneau cover according to claim 9, wherein:
the first hinge member comprises a bottom surface; and
the top surface of the first hinge member and the bottom surface define an opening configured to receive an edge of a panel such that there is no seam formed from the coupling of the first hinge member and the panel.

14. The hinge for the tonneau cover according to claim 9 further comprising a sealing member positioned between the first hinge member and the second hinge member.

* * * * *